United States Patent [19]

Alf et al.

[11] Patent Number: 4,565,176
[45] Date of Patent: Jan. 21, 1986

[54] DEVICE FOR CONTROLLING THE INTAKE AIR TEMPERATURE OF A MIXTURE-COMPRESSING INTERNAL COMBUSTION ENGINE

[75] Inventors: Herbert Alf, Ludwigsburg; Rudolf Leipelt, Oberstenfeld; Rolf Füsser, Ingersheim; Helmut Spannbauer, Ludwigsburg-Ossweil, all of Fed. Rep. of Germany

[73] Assignee: Filterwerk Mann & Hummel GmbH, Ludwigsburg, Fed. Rep. of Germany

[21] Appl. No.: 648,935

[22] Filed: Sep. 10, 1984

[30] Foreign Application Priority Data

Sep. 10, 1983 [DE] Fed. Rep. of Germany ....... 3332737
Mar. 9, 1984 [DE] Fed. Rep. of Germany ....... 3408609

[51] Int. Cl.$^4$ ............................................. F02M 31/00
[52] U.S. Cl. .................................... 123/556; 123/552; 236/13
[58] Field of Search ................... 123/552, 556; 236/13, 236/93, 101 C

[56] References Cited

U.S. PATENT DOCUMENTS

| | | | |
|---|---|---|---|
| 3,782,349 | 1/1974 | Kamo | 123/552 |
| 3,801,078 | 4/1974 | Denton | 123/552 |
| 3,974,808 | 8/1976 | Heitert | 123/556 |
| 4,340,172 | 7/1982 | Poore | 123/552 |

FOREIGN PATENT DOCUMENTS

| | | |
|---|---|---|
| 135591 | 11/1933 | Austria . |
| 1526662 | 2/1971 | Fed. Rep. of Germany . |
| 1576561 | 4/1971 | Fed. Rep. of Germany . |
| 1926181 | 7/1971 | Fed. Rep. of Germany . |
| 2009236 | 6/1972 | Fed. Rep. of Germany . |
| 2755086 | 6/1979 | Fed. Rep. of Germany . |
| 1588568 | 4/1981 | United Kingdom ................ 123/556 |

Primary Examiner—Ronald H. Lazarus
Attorney, Agent, or Firm—Joseph A. Geiger

[57] ABSTRACT

An intake air temperature control device for mixture-compressing internal combustion engines having an inlet flapper proportioning the flows of cold and preheated raw air into a duct junction and into raw air mixing duct, the flapper-adjusting wax thermostat being arranged inside a thermostat chamber into which branch flows of cold and preheated raw air are admitted through two calibrated branch inlets. A narrow annular gap through which the combined branch flows must pass assures an integrated response of the thermostat to changing temperatures and air intake speeds. A lost-motion drive connection and a biasing member produce a full-load correction of the adjusted temperature. The flapper drive members may have valve edges which cooperate with the calibrated branch inlets to open and close the latter.

20 Claims, 6 Drawing Figures

DEVICE FOR CONTROLLING THE INTAKE AIR TEMPERATURE OF A MIXTURE-COMPRESSING INTERNAL COMBUSTION ENGINE

BACKGROUND OF THE INVENTION

1. Field of the Invention

The present invention relates to air intake systems for internal combustion engines and, more particularly, to an air intake system for carburetor-type and fuel-injection-type internal combustion engines featuring a device for controlling the intake air temperature by means of a continuously adjustable air proportioning valve which admits a variable ratio of cold air and preheated air to maintain an optimal air intake temperature under changing ambient temperatures.

2. Description of the Prior Art

Various devices aimed at maintaining an even air intake temperature under changing ambient temperatures, especially low ambient temperatures, are known from the prior art.

One such device is suggested in the German Pat. No. 15 26 662. This device is simple in its configuration and therefore suitable for mass production at low cost. It features a right-angle junction between a cold air intake duct and a warm air intake duct which is controlled by a pivotable inlet flapper. In one extreme position, the flapper closes the cold air intake duct while opening the warm air intake duct and, in the other extreme position, it closes the warm air intake duct while opening the cold air intake duct. A wax thermostat is arranged in the raw air mixing duct downstream of the duct junction and its drive pin is connected to the shaft of the inlet flapper by means of a rod and linkage. As the temperature of the air flowing past the wax thermostat increases, the latter moves the flapper in the direction of closing the warm air intake duct, in opposition to a return spring. The wax thermostat, as a control element, provides adequate adjustment output for this purpose, both in terms of adjustment force and in terms of adjustment stroke.

However, it has been found that the location of the wax thermostat in the raw air mixing duct presents a certain problem, inasmuch as the actual temperature response of the wax thermostat may deviate considerably from the average temperature of the aspirated raw air, the deviation being different under different operating conditions of the internal combustion engine.

This response deviation is due to the fact that, in the area of the wax thermostat, the raw air flow forms distinct strands of warm and cold air which, depending on the amount of air flow passing through the air intake system, impinge on the housing of the wax thermostat in different ways.

Past experience has also shown that these apparent inconsistencies in the thermostat response cannot be sufficiently compensated for by relocating the wax thermostat at a greater distance from the duct junction and by transmitting the displacements of the thermostat pin to the inlet flapper with appropriate mechanical, hydraulic or pneumatic means. On the other hand, it is a fact that the longer transmission path increases the complexity and the cost of the device, while representing an additional potential source of malfunction.

The German Offenlegungsschrift No. 19 26 181 describes a device for controlling the intake air temperature by means of two thermostats which cooperate to adjust a pivotable inlet valve controlling the flow out of oppositely located cold air and warm air inlet ducts into a duct junction. The two thermostats are bimetallic spiral springs. They are arranged in a series-type drive connection which transmits the sum of the thermostat displacements to the pivot shaft of the inlet valve. One thermostat is arranged on the outside of the duct junction, so as to respond to the ambient air temperature, and the other thermostat is arranged near the upstream extremity of the raw air mixing duct.

The purpose of this structure is to provide a compensation for the heat losses which occur, when the raw air flow passes through the cold filter assembly, with the aim of supplying combustion air to the carburetor at a temperature which is as even as possible, independently of the operating condition of the internal combustion engine. However, this objective is attained only to a limited degree, because the air inlet valve does not fully take into account changes which take place in the warm air supply under different engine operating conditions. It follows that the resultant temperature of the mixed raw air is again uneven.

The German Offenlungsschrift No. 27 55 086 discloses a device which uses two wax thermostats in two different versions of the device. The first version features two right-angle junctions, a first one between two intake ducts for warm air and cold air with a pivotable inlet flapper which is controlled by a wax thermostat arranged in the raw air mixing duct, and a second one between the raw air mixing duct downstream of the first duct junction and a second cold air intake duct with a similar inlet flapper which is controlled by the second wax thermostat. The latter is arranged in the second cold air intake duct which thus serves as a bypass inlet.

The second thermostat responds to an elevated ambient temperature by completely closing off the first right-angle junction from the raw air mixing duct, admitting only cold air through the bypass inlet. The response behavior of the first thermostat in the raw air mixing duct is again characterized by deviations which are due to the formation of separate flow strands of cold and warm air in the duct.

The second version of the device disclosed in this publication has a single duct junction with a pivotable inlet flapper which is controlled by two wax thermostats of which one is arranged in the raw air intake duct and the other is arranged in the cold air intake duct. The drive connection between the two wax thermostats and the flapper shaft is of the parallel, lost-motion type, i.e. non-additive. Again, the wax thermostat in the raw air mixing duct is operating under response deviations, due to the large cross section of the mixing duct which permits separate flow strands of different temperatures to flow past the thermostat.

The Austrian Pat. No. 135 591 discloses a T-junction between two axially aligned opposing intake ducts for warm air and cold air, respectively, and a raw air mixing duct, the flows from the two intake ducts being controlled by means of two rotary disc valves which are mounted on a common shaft in the center axis of the two intake ducts. Connected to the axial extremities of this shaft are the ends of two thermostat members in the form of bimetallic spiral springs, one thermostat member being arranged in the cold air intake duct and the other being arranged in the warm air intake duct.

The connection between the valve shaft and the spiral springs may be of the series-type, in which case the displacements of the two thermostat members are added together, or it may be of the parallel-type, in which case the displacements are averaged out. This device has the shortcoming that it does not take into account any differences in the flow rates at which air passes through the two intake ducts, so that uneven temperatures of the mixed raw air are obtained. The axially aligned, opposing configuration of the two intake ducts is difficult to accommodate in an air intake system for an internal combustion engine. The two rotary disc valves provide a relatively small flow cross section in the ducts, and the overall device is complex and therefore costly to manufacture in mass production.

SUMMARY OF THE INVENTION

Underlying the present invention is the primary objective of suggesting an improved temperature control device for mixture-compressing internal combustion engines which, under avoidance of the aforementioned shortcomings of the prior art solutions, provides a more reliable temperature maintenance with comparatively simple and robust structural components.

The present invention proposes to attain this objective by suggesting a novel device for controlling the intake air temperature in the air intake systems of carburetor-type or fuel-injection-type internal combustion engines, the device having a pivotable inlet flapper which serves as a flow proportioning valve in a right-angle duct junction between a cold air intake duct, a warm air intake duct and a raw air mixing duct upstream of the air filter.

The wax thermostat which is used to adjust the angular position of the inlet flapper is arranged inside a thermostat chamber, where the wax thermostat is exposed to the combined branch flows of cold raw air and preheated raw air which enter the thermostat chamber through two calibrated branch inlets from outside the intake system in the case of cold raw air, or from the warm air intake duct, in the case of preheated raw air.

In a preferred embodiment of the invention, the thermostat chamber is tubular and the wax thermostat is arranged concentrically to the chamber wall, so as to from a narrow annular flow gap through which the branch flows of cold and preheated raw air must pass.

The decisive advantage of this arrangement arises from the narrow flow gap which greatly improves the accuracy of the response of the wax thermostat. The latter no longer depends on the degree to which the cold raw air and the preheated raw air are mixed together, when they flow past the wax thermostat. For, even if the two branch flows are or still moving in strands of different temperatures, it is impossible for any flow strand to pass through the narrow annular flow gap surrounding the housing of the wax thermostat, without impinging on the thermostat housing.

The wax body and the housing of the wax thermostat respond to the average temperature of the passing branch flows, thus integrating their heat contents. It no longer matters, whether or not the two branch flows are mixed together. The prior art problem of flow strands "sneaking past the thermostat" at a distance from the latter, and the changes in the "sneak patterns" which result form different flow rates at different engine speeds are effectively neutralized by the arrangement of a separate thermostat chamber, as suggested by the present invention.

The thermostat chamber is preferably arranged inside the raw air mixing duct, just downstream of the duct junction, so that the flapper drive rod which connects the drive pin of the wax thermostat with a drive arm of the inlet flapper can be arranged just below the opening of the warm air intake duct. This places the outlet of the thermostat chamber into the raw air mixing duct and provides a convenient calibrated branch inlet for preheated raw air at the upstream extremity of the thermostat chamber via the guide bore for the flapper drive rod. The location of the branch inlet for cold raw air can be arranged in a variety of locations, but preferably it is arranged just upstream of the wax thermostat.

In order to compensate for variations in parts tolerances in mass production and also for age-related changes occurring in the wax thermostat, it may be advantageous to arrange for one of the two calibrated branch inlets to be controlled by a valve mechanism, while the other calibrated branch inlet remains permanently open.

The operation of the intake air temperature control device can be further refined and improved by arranging a valve action on both calibrated branch inlets, in conformance with a further suggestion of the present invention. Such a valve action is conveniently obtainable by using the flapper drive rod to provide a valve edge which opens and closes the warm air branch inlet in the guide bore at the upstream extremity of the thermostat chamber, as the flapper drive rod is displaced by the wax thermostat. In a similar manner, the downstream extremity of a drive sleeve arranged between the flapper drive rod and the wax thermostat can serve as a valve edge which cooperates with the cold air branch inlet in the wall of the thermostat chamber to open and close the latter.

This valve arrangement makes it possible to proportion the branch flows of cold raw air and preheated raw air in the same ratio in which the inlet flapper proportions the main flows of cold raw air and preheated raw air entering the duct junction from the cold air intake duct and warm air intake duct, respectively.

Experiments have shown that the cold air branch inlet need not necessarily be arranged near the inlet of the cold air intake duct. While it is possible that a difference may exists between the temperature of the ambient air at a direct opening into the thermostat chamber and the ambient air at the inlet of the cold air intake duct, it has been found that this temperature difference remains substantially unchanged at different levels of ambient temperature, so that it can be compensated for by appropriately adjusting the control parameters of the device. On the other hand, a simple modification of the device makes it possible to assure that the same cold raw air which enters the cold air intake duct is also supplied to the cold air branch inlet of the thermostat chamber. This modification involves the use of a branch channel which leads from the cold air branch inlet to a location near the inlet of the cold air intake duct.

Additional advantages derive from the present invention, inasmuch as the latter makes is possible to adapt the intake air temperature control device to engine operation under full load at cold ambient temperatures, when it is desirable to lower the temperature of the aspirated combustion air, without at the same time running the risk of causing carburetor icing.

This adaptation can be achieved by arranging the inlet flapper in such a way that it reaches into the main flow of incoming cold raw air in a cantilever fashion and by arranging a lost-motion drive connection between the flapper drive rod and the inlet flapper in conjunction with a biasing member which maintains the inlet flapper in its normal adjustment position, but yields when a high volume of cold raw air is aspirated under full-load operation. The lost-motion drive connection may be in the form of a recess in the flapper drive rod with two axially spaced faces between which the flapper drive arm of the inlet flapper is movable to accomplish the full-load adaptation.

The biasing member may be in the form of a biasing weight carried by a weight arm in the cold air intake duct, or in the form of a spring taking the place of the biasing weight. Similar solutions to the adaptation for full-load operation of a differently structured temperature control device are known from the German Pat. No. 20 09 236.

In order to overcome the shortcoming of a spring which provides and uneven bias at different angular positions of the inlet flapper, the present invention proposed to arrange the biasing member directly at the lost-motion drive connection, taking the form of a tension spring which has one extremity attached to the drive arm of the inlet flapper and the other extremity attached to the flapper drive rod.

A further suggestion of the present invention involves the use of a biasing member which employs the negative pressure which is generated by a carburetor-type internal combustion engine in the intake duct downstream of the carburetor throttle. In this modification, a pneumatic actuator is arranged opposite the duct junction, its push-pull rod being connected to the inlet flapper.

The negative pressure from the engine intake duct produces a variable biasing force which changes as an inverse function of the engine load, being lowest under full-load operation. A return spring in the pneumatic actuator opposes the negative air pressure. Pneumatic actuators of this type are known from the prior art; see, for example, German Pat. No. 15 76 561.

BRIEF DESCRIPTION OF THE DRAWINGS

Further special features and advantages of the invention will become apparent from the description following below, when taken together with the accompanying drawings which illustrate, by way of example, preferred embodiments of the invention which are represented in the various figures as follows.

DESCRIPTION OF THE PREFERRED EMBODIMENTS

Figure 1:
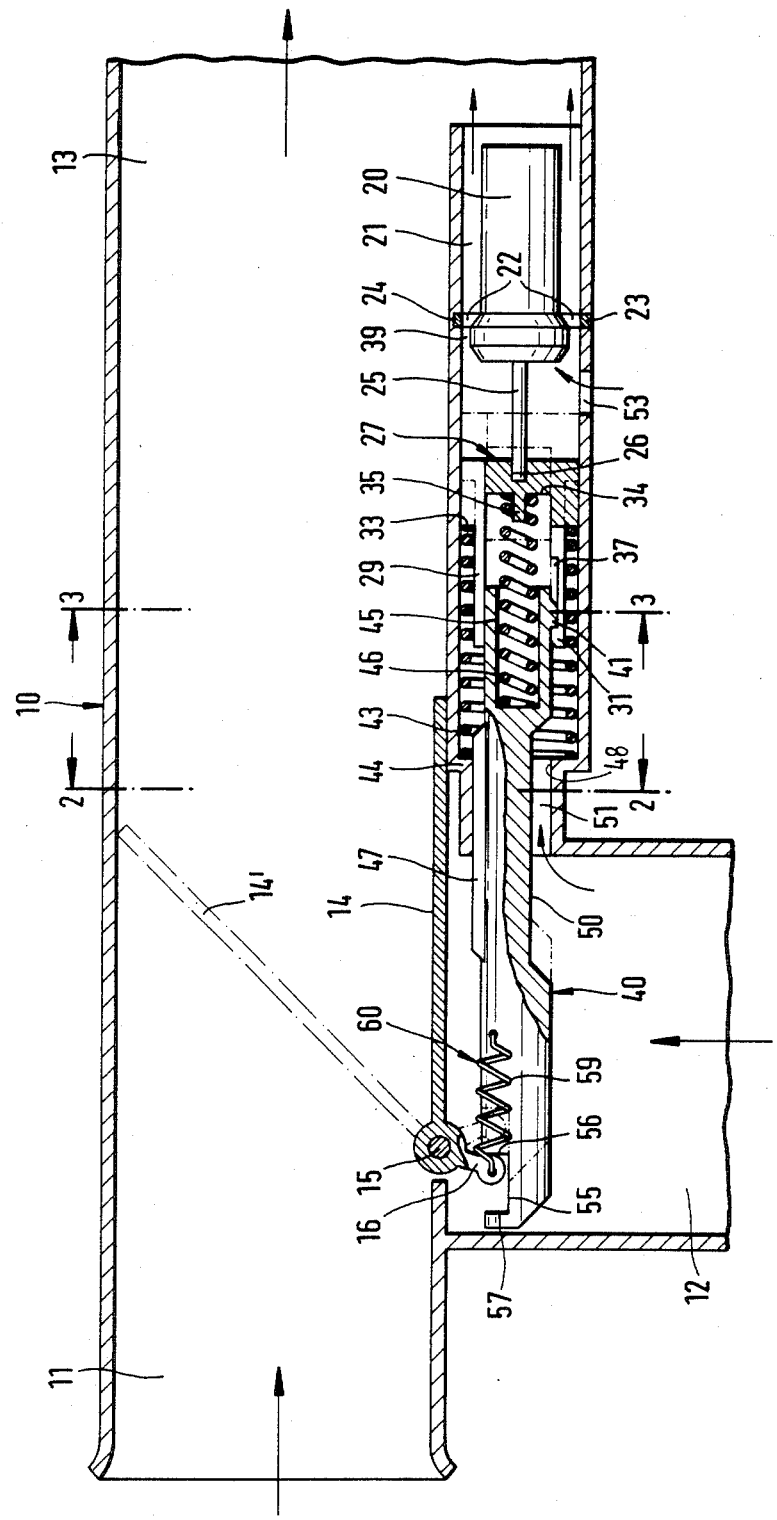
FIG. 1 shows, in a sectional view taken along a vertical longitudinal center plane, a first embodiment of the present invention.

FIG. 1 shows the inlet portion of an air intake system of a mixture-compressing internal combustion engine for which the temperature control device of the invention is intended. The raw air inlet is in the form of a raw air duct 10 which consists of a generally horizontally oriented cold air intake duct 11, a generally vertically oriented warm air intake duct 12 and a generally horizontally oriented raw air mixing duct 13. The latter leads to the air intake filter (not shown) of the internal combustion engine.

It should be understood that the stated orientations are given by way of example only and, while they are preferred orientations in connection with vehicular applications of the device of the invention, are not to be seen as necessary features which are necessary for practicing of the present invention.

The vertical warm air intake duct 12 opens into the horizontal cold air intake duct 11 in a right-angle junction. Near the upstream corner of this junction is arranged a generally flat inlet flapper 14 which is pivotably supported on a horizontal flapper shaft 15. The inlet flapper 14 is so arranged in relation to the duct junction that, in one of its two end positions, as shown in FIG. 1, it substantially closes off the warm air intake duct 12, while opening the cold air intake duct 11 to the raw air mixing duct 13 and, in its other end position, indicated by stippled lines at 14', it substantially closes off the cold air intake duct 11 while opening the warm air intake duct 12.

The angular position of the inlet flapper 14 is continuously adjustable between the two end positions, for the admission into the raw air mixing duct 13 of cold and warm raw air at a correspondingly changing ratio. The warm air intake duct 12 receives preheated raw air from an exhaust stove (not shown) which is associated with the exhaust manifold of the internal combustion engine.

On the downstream side of the duct junction, and extending alongside the raw air mixing duct 13, is a cylindrical thermostat chamber 21 with a downstream opening into the raw air mixing duct 13. Inside the thermostat chamber 21 is arranged a stationary cylindrical wax thermostat 20. The latter is supported in a mounting collar 23 which is received in a recess 24 of the wall of the thermostat chamber 21 and has near its periphery a number of air passages 22 for the flow of raw air past the housing of the wax thermostat 20.

A drive pin 25 extends horizontally form the upstream side of the wax thermostat 20 into a blind bore 26 of a drive sleeve 27 to provide a pushing engagement with the latter. The drive sleeve 27 has its downstream extremity guided for movements inside the thermostat chamber 21 and is connected on its upstream extremity to a flapper drive rod 40.

Figure 3:
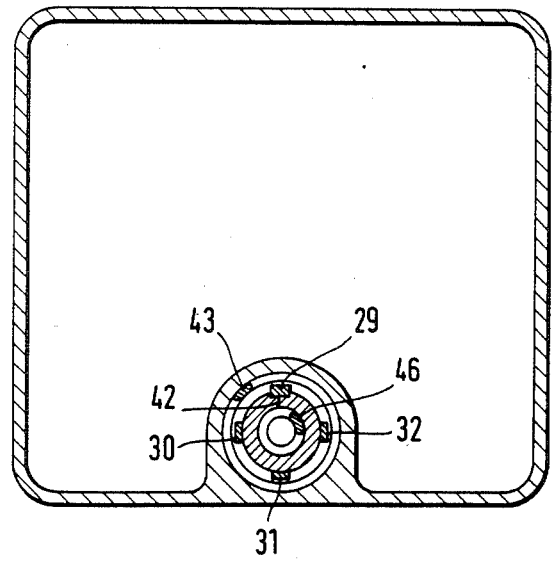
FIG. 3 is a cross-sectional view taken along line III—III of FIG. 1.

This drive connection is obtained by means of four longitudinal ribs 29, 30, 31 and 32 which form the upstream end portion of the drive sleeve 27 and embrace a cylindrical end portion of the flapper drive rod 40. The four longitudinal ribs 29–32 have interior radial recesses 37 with which they engage a collar 41 of the flapper drive rod 40. As can be seen in FIG. 3, the longitudinal rib 29 also engages an axial groove 42 of the collar 41 to provide a rotational connection.

As can be seen in FIG. 1, the axial extent of the radial recesses 37 of the four longitudinal ribs 29–32 is greater than the axial width of the collar 41. It follows that the drive connection between the drive sleeve 27 and the flapper drive rod 40 allows for a limited relative axial displacement between the two drive members while they remain rotationally connected.

Surrounding the downstream end portion of the flapper drive rod 40 and the connected upstream end portion of the drive sleeve 27 inside the thermostat chamber 21 is a compression-type return spring 43. The latter has one axial extremity bearing against an interior shoulder 44 of the thermostat chamber 21 and the other axial extremity bearing against shoulders 33 of the longitudinal ribs 29–32 of the drive sleeve 27.

A blind bore 45 in the downstream end portion of the flapper drive rod 40 accommodates a compression-type overload relief spring 46 which has one extremity bearing against the bottom of the blind bore 45 and its other extremity bearing against an inner bottom 34 of the drive sleeve 27, being positioned radially by means of a centering pin 35 of the drive sleeve 27.

Figure 2:
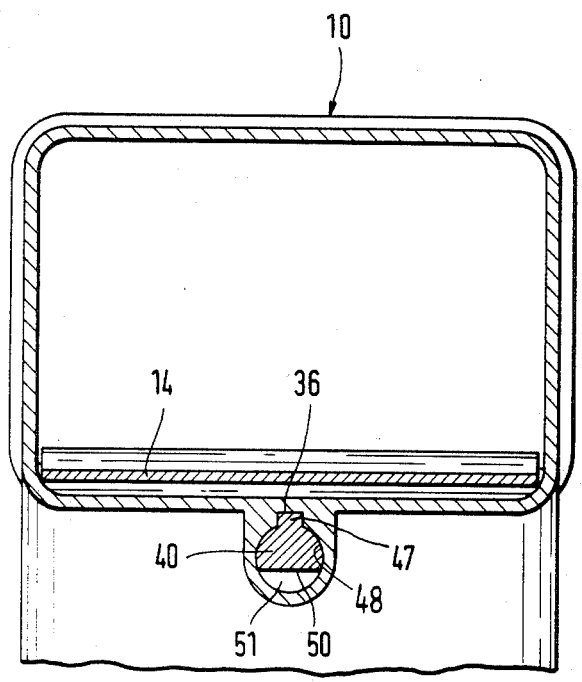
FIG. 2 is a cross-sectional view taken along line II—II of FIG. 1.

On its upstream side, the cylindrical thermostat chamber 21 opens into a guide bore 48 of smaller diameter which, in turn, is open to the warm air intake duct 12 in the immediate vicinity of the duct junction. The flapper drive rod 40 reaches through the guide bore 48, being supported and guided by the latter. As can be seen in FIG. 2, the guide bore 48 has in its upper wall an axial guide groove 36 which cooperates with a guide key 47 of the flapper drive rod 40. On its lower side, the flapper drive rod 40 has a recessed flat 50 which forms a segment-shaped axial opening with the surrounding wall of the guide bore 48. This axial opening is a calibrated warm air branch inlet 51 for the admission of warm raw air into the thermostat chamber 21.

In the lower wall of the thermostat chamber 21, at a point between the drive sleeve 27 and the wax thermostat 20, is arranged an cold air branch inlet 53 for the admission of cold raw air, i.e. ambient air, into the thermostat chamber 21.

The flapper drive rod 40 reaches horizontally across the warm air intake duct 12 and under the flapper shaft 15, where it has an upwardly open recess 55 with an axially outwardly facing driving face 56 and an oppositely facing counter face 57. The driving face 56 bears against a bulb-shaped extremity of a flapper drive arm 16 of the inlet flapper 14. The distance between the driving face 56 and the counter face 57 is approximately equal to twice the thickness of the bulb-shaped extremity of the flapper drive arm 16, thus forming a lost-motion drive connection between the flapper drive rod 40 and the inlet flapper 14.

A retaining spring 59 of the tension-type serves as a biasing member 60 in this lost-motion connection, one extremity of the retaining spring 59 being engaged in a transverse bore of the flapper drive arm 16, and the other extremity being engaged in a transverse bore of the flapper drive rod 40. The biasing member 60 provides a driving engagement between the inlet flapper 14 and the flapper drive rod 40 which disengages only, when the inlet flapper 14 reaches its upper end position at 14', or when an elevated intake suction displaces the inlet flapper 14, as will be described further below.

A branch flow of preheated raw air enters the thermostat chamber 21 through the warm air branch inlet 51, flowing past the drive sleeve 27 between its longitudinal ribs 29–32 and through axial grooves in its guided rear end portion. To the warm air branch flow is admixed to a branch flow of cold raw air which enters transversely into the thermostat chamber 21 through the cold air branch inlet 53.

This air mixture flows past the wax thermostat 20 by passing through an annular flow gap 39 between the enlarged base portion of the thermostat and the wall of the thermostat chamber 21. The smallest flow cross section of the flow gap 39 is approximately equal to to 2 percent of the smallest flow cross section of the raw air mixing duct 13. The flow cross section downstream of the flow gap 39 between the housing of the wax thermostat 20 and the wall of the thermostat chamber 21 is somewhat larger than twice the flow cross section of the flow gap 39.

The temperature control device of the invention, as illustrated in FIGS. 1–3, operates as follows:

In FIG. 1, the inlet flapper 14 is shown in its lower end position in which it closes off the warm air intake duct 12, so that only cold raw air is drawn into the raw air duct 10 through the cold air intake duct 11. The direction of air flow is indicated by arrows. The initial assumption is that the temperature of the ambient air is at a level which corresponds to the temperature at which combustion air is to be supplied to the internal combustion engine by the air intake system.

A rise in the ambient air temperature above this level produces a corresponding additional extension of the drive pin 25 on the wax thermostat 20. But, because the inlet flapper 14 is already in its end position, it prevents the flapper drive rod 40 from advancing any further. The additional extension of the drive pin 25 is taken up by the overload relief spring 46 which is compressed accordingly.

A drop of the ambient air temperature produces a corresponding retraction of the thermostat drive pin 25, thereby allowing the return spring 43 to push the drive sleeve 27 and the connected flapper drive rod 40 towards the wax thermostat 20 in a retraction movement. The retaining spring 59, by biasing the flapper drive arm 16 against the moving driving face 56 of the flapper drive rod 40, moves the inlet flapper 14 in a counterclockwise direction to an intermediate position in which some preheated raw air is drawn in through the warm air intake duct 12 and some cold raw air is drawn in through the cold air intake duct 11.

The angle of the intermediate flapper position determines the relative proportions of preheated raw air and cold raw air which are drawn in through the warm air intake duct 12 and the cold air intake duct 11, respectively. The lower the ambient temperature, the higher the intermediate flapper position. At a certain low ambient temperature level, the inlet flapper 14 is moved to its upper end position 14' in which it completely closes off the cold air intake duct 11, admitting only preheated air to the raw air mixing duct 13.

With the inlet flapper 14 in its upper end position 14', due to a correspondingly low ambient temperature, an increase in intake suction under full-load operation of the engine has the effect of causing the inlet flapper 14 to move downwardly to an intermediate position in which it admits cold raw air, as the flapper drive arm 16 moves away from the driving face 56 of the flapper drive rod 40 while extending the retaining spring 59.

This lowering of the combustion air temperature under full-load operation is desirable, because it increases the output of the internal combustion engine. However, care must be taken with carburetor-equipped internal combustion engines not aspirate too much cold air, which could cause carburetor icing. This danger is avoided by the counter face 57 on the flapper drive rod 40 which limits the suction-induced opening of the cold air intake duct 11 by engaging the bulb-shaped extremity of the flapper drive arm 16 from the opposite side.

The degree to which the counter face 57 on the flapper drive rod 40 permits a suction-induced opening of the cold air duct under full-load operation depends on the temperature of the ambient air and/or of the preheated air. The more one or both of these temperatures drop, the closar the counter face 57 moves to the flapper drive arm 16, until, at a certain low level of the combined temperature, the drive pin 25 of the wax thermostat 20 and the flapper drive rod 40 are withdrawn so far that the counter face 57 blocks the inlet flapper 14 in its upper end position 14', regardless of the level of suction in the raw air duct 10.

The arrangement of the wax thermostat 20 inside a special thermostat chamber 21 which is traversed by branch flows of preheated raw air and cold raw air offers the advantage that the response of the wax thermostat 20 reflects at all times the true temperature of a mixture of the two raw air components, whether or not they are evenly mixed when they flow past the wax thermostat 20. This result is based on the fact that both branch flows must pass through the narrow annular flow gap 39 between the base of the wax thermostat 20 and the wall of the thermostat chamber 21 and from there through a wider but much longer annular gap which surrounds the housing of the wax thermostat 20.

It follows that, even in the event that the air in the thermostat chamber 21 should flow past the wax thermostat 20 in separate strands of colder and warmer air, no flow strand can pass without impinging on the housing of the wax thermostat 20. The wax thermostat 20 integrates the temperature inputs received from the various flow strands, giving the same temperature response as if the branch flow were evenly mixed.

Figure 4:
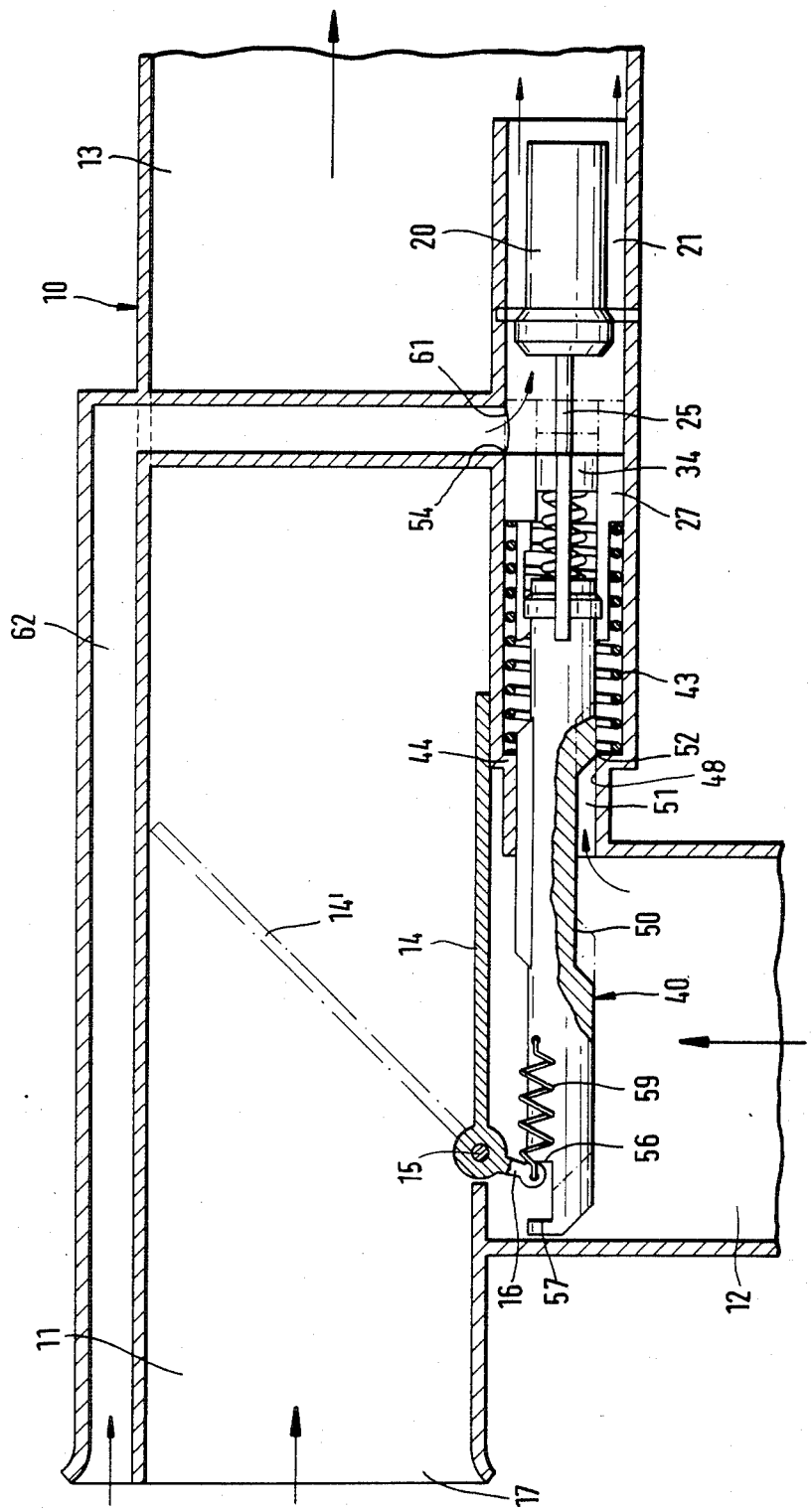
FIG. 4 is similar to FIG. 1, showing a second embodiment of the present invention.

In FIG. 4 is shown a second embodiment of the temperature control device of the invention. This embodiment is very similar to the first embodiment which has been described in connection with FIGS. 1-3, and it is therefore to be assumed that those features which are not specifically mentioned in the second embodiment are unchanged from the first embodiment.

A first difference between the two embodiments resides in the arrangement of the branch inlet through which cold raw air enters the thermostat chamber 21. The cold air branch inlet 61 is arranged at the inner wall of the thermostat chamber 21, receiving cold air through an elbow-shaped branch channel 62 which traverses the raw air mixing duct 13 and runs parallel to the cold air intake duct 11, so as to have its intake opening adjacent to the cold air inlet 17 of the cold air intake duct 11.

This arrangement assures that the branch flow of cold raw air which is admixed to the branch flow of preheated raw air from the warm air branch inlet 51 is drawn from the same ambient air from which the main flow of cold raw air is drawn.

A second difference resides in the arrangement of the recessed flat 50 on the flapper drive rod 40 which defines the shape of the warm air branch inlet 51. This recessed flat 50 is so arranged that its right-hand extremity forms a valve edge 52 which cooperates with the shoulder 44 at the transition between the thermostat chamber 21 and the guide bore 48 to open and close the warm air branch inlet 51. The effect of this valve operation will be described further below.

A further difference between the two embodiments relates to the location of the cold air branch inlet 61 in relation to the downstream extremity of the drive sleeve 27 which, by moving across the opening of the cold air branch inlet 61, forms a valve with a valve edge 54 which opens and closes the inlet 61.

In operation, the lower end position of the inlet flapper 14 of the second embodiment reflects, as in the first embodiment, an assumed ambient temperature which corresponds to the desired temperature at which combustion air is to be supplied to the internal combustion engine. FIG. 4 shows that, in this position of the device, the cold air branch inlet 61 is open and the warm air branch inlet 51 is closed, the valve edge 52 of the flapper drive rod 40 being engaged against the edge of the guide bore 48. As a result, only a branch flow of cold raw air enters the thermostat chamber 21, in the same way as only cold raw air enters the cold air intake duct 11.

A drop in the ambient temperature produces a corresponding retraction of the thermostat drive pin 25, so that the flapper drive rod 40 executes a corresponding displacement in the direction of the wax thermostat 20, under the action of the return spring 43. As the valve edge 52 of the flapper drive rod 40 moves away from the edge of the guide bore 48, it opens the warm air branch inlet 51 to the thermostat chamber 21, thereby admitting a branch flow of preheated raw air from the warm air intake duct 12. Simultaneously, the valve edge 54 of the drive sleeve 27 moves partially over the cold air branch inlet 61, thereby reducing the branch flow of cold air form the branch channel 62.

The same displacement of the flapper drive rod 40 also moves the inlet flapper 14 to an intermediate position in which a certain amount of preheated raw air is admitted into the raw air mixing duct 13, where it is mixed with the cold raw air from the cold air intake duct 11. The lower the ambient temperature, the greater the proportion of preheated raw air which is admitted into the thermostat chamber 21 in the branch flow and similarly into the raw air mixing duct 13 in the main flow.

At a certain low ambient temperature, the inlet flapper 14 is moved to its upper end position 14' in which only preheated raw air is drawn into the raw air mixing duct 13 via the warm air intake duct 12. The corresponding positions of the valve edges 52 and 54 of the flapper drive rod 40 and of the drive sleeve 27, respectively, are indicated in FIG. 4 in stippled lines. They indicate that, at such a low ambient temperature, the warm air branch inlet 51 is open while the cold air branch inlet 61 is closed, so that only a branch flow of preheated raw air is admitted to the thermostat chamber 21.

The valve control of the warm air branch inlet 51 and cold air branch inlet 61 into the thermostat chamber 21 has the advantage that the air mixture which reaches the wax thermostat 20 corresponds closely to the air mixture which passes through the raw air mixing duct 13. It has the additional advantage of compensating for deviations in the tolerances and/or for age-related changes in the wax thermostat 20 which would otherwise reflect themselves in undesirable deviations in the temperature of the aspirated combustion air from the optimal temperature.

The major difference between the two embodiments described above in connection with FIGS. 1-3 and FIG. 4, respectively, thus resides in the intake of the two branch flows of cold raw air and preheated raw air into the thermostat chamber 21. In the first embodiment, this intake occurs through two calibrated openings of fixed cross section and, in the second embodiment, it is controlled by two moving valve edges.

While it should be evident from this description that the second embodiment provides the most accurate maintenance of the combustion air temperature, its has been found that the results obtained with the first embodiment are adequate for a variety of operational conditions.

Lastly, it should be understood that it is also possible to combine the features of the two embodiments in such a way that only one of the two branch air inlets is valve-controlled, while the other inlet remains a calibrated opening under all operating conditions.

Figure 5:
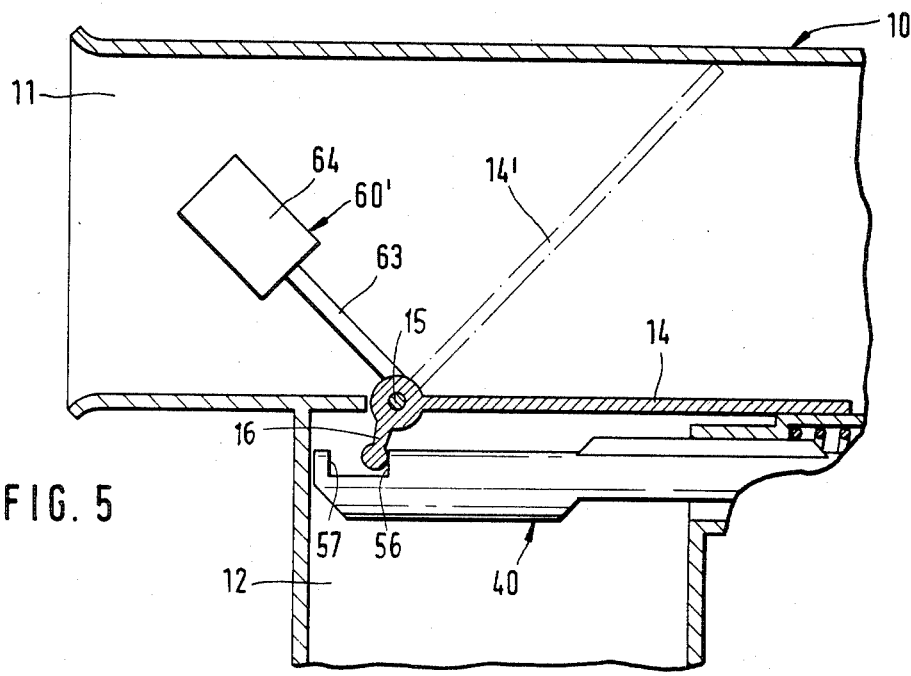
FIG. 5 shows a portion of FIG. 1 with a modification to the device of the invention.

FIG. 5 shows a modification of the temperature control device of the invention which is applicable to either of the two embodiments described above. This modification suggests the replacement of the spring-type biasing member 60 on the flapper drive rod 40 with a weight-type member 60' on the inlet flapper 14. For this purpose, the latter has attached to its hub a weight arm 63 which carries a biasing weight 64. The action of the weight 64 maintains the flapper drive arm 16 in driving contact with the driving face 56 of the flapper drive rod 40, except when, under full-load operation of the internal combustion engine at a low ambient temperature, the inlet flapper 14 moves away from its upper end position 14' under increased intake suction.

Instead of using the biasing weight 64, it is also possible to use a biasing spring of the tension-type which has one extremity attached to the weight arm 63 and the other extremity attached to the bottom wall of the cold air intake duct 11 near its inlet opening.

Figure 6:
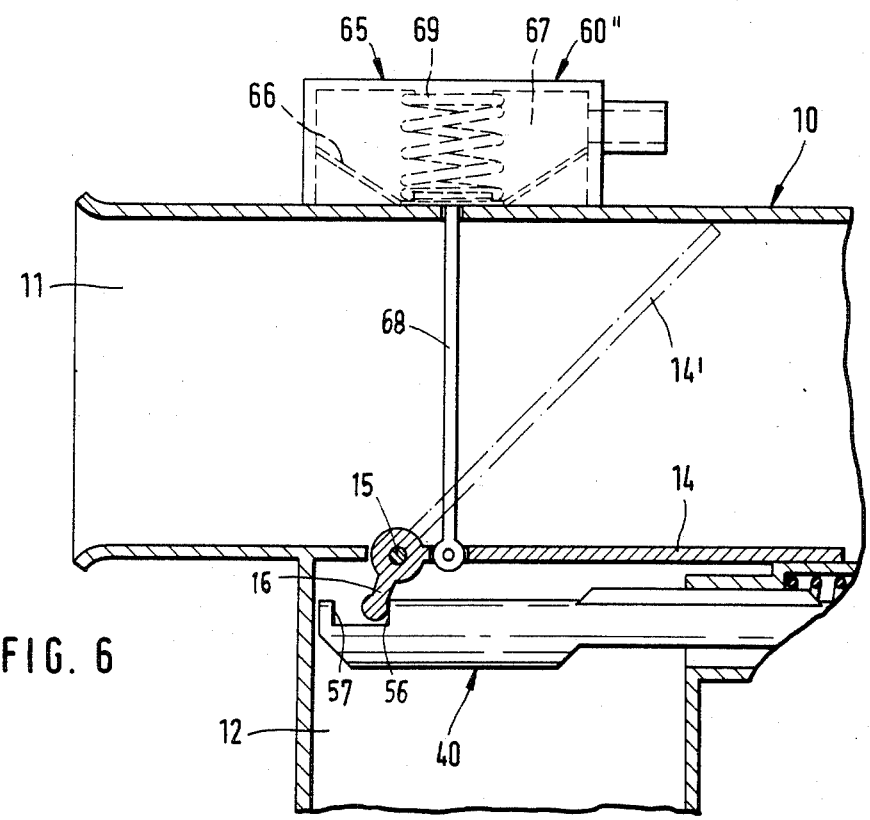
FIG. 6 likewise shows a portion of the device of FIG. 1 with a further modification to the device of the invention.

A further modification of the temperature control device is shown in FIG. 6, where the spring-type biasing member 60 of the two earlier-described embodiments of the invention is replaced with a pneumatic biasing device 60" in the form of a pneumatic actuator 65. The latter comprises a closed housing with a diaphragm 66 at the lower end of a pressure space 67, a drive linkage 68 connecting the diaphragm 66 with the inlet flapper 14 being urged downwardly by a return spring 69.

The pressure space 67 receives negative air pressure through a suction line (not shown) which is connected to the intake duct of the internal combustion engine, downstream of the main throttle of the carburetor. When the throttle is closed, or almost closed, and the engine operates at idle, the intake duct of the engine is subjected to an elevated negative pressure which, when transmitted to the pressure space 67 of pneumatic actuator 65, pulls the inlet flapper 14 upwardly in a counterclockwise direction, until the extremity of its flapper drive arm 16 abuts against the driving face 56 of the flapper drive rod 40.

As the main throttle in the carburetor is opened for a higher engine load, the negative pressure in the pressure space 67 decreases, with the result that the return spring 69 moves the diaphragm 66 downwardly, thereby adjusting the inlet flapper 14 in a clockwise direction for the admission of a greater proportion of cold raw air. As stated further previously, this feature of the device which resets the inlet flapper 14 for the intake of colder raw air under higher engine operating loads has the effect of increasing the power output of the engine.

In the suction line which connects the pressure space 67 of the pneumatic actuator 65 to the engine intake duct is further arranged a known pressure relief valve with a thermostat responsive to the temperature of the air mixture which is supplied to the carburetor, so that the pneumatic actuator 65 is de-activated, as the air temperature rises above a predetermined level. Such a thermostat-controlled relief valve is disclosed in U.S. Pat. No. 4,144,857. This feature further improves the control characteristics of the device by compensating for temperature losses occurring upstream of the relief valve thermostat. The latter is preferably arranged in the clean air space of the intake air filter.

The displacement force exerted by the wax thermostat 20 on the drive pin 25 is greater than the compression preload of the overload relief spring 46 which, in turn, is greater than the force required to compress the return spring 43 of the flapper drive rod 40. The force exerted by the various flapper biasing members, whether retaining spring 59, return weight 64, or pneumatic actuator 65, is smaller than the force necessary to compress the return spring 43.

It should be understood, of course, that the foregoing disclosure describes only preferred embodiments of the invention and that it is intended to cover all changes and modifications of this example of the invention which fall within the scope of the appended claims.

We claim the following:

1. In an air intake system supplying combustion air to an internal combustion engine which compresses and burns a mixture of fuel and combustion air obtained either by means of a carburetor or through the injection of fuel into the air intake system, in such a system, a device for controlling the intake air temperature comprising:

a raw air duct including a cold air intake duct with an inlet for raw air of ambient temperature, a transversely oriented warm air intake duct connected to a source of preheated raw air and joining the cold air intake duct in a duct junction, and a raw air mixing duct downstream of the duct junction;

a flow proportioning valve arranged in the area of the duct junction, the flow proportioning valve being movable between two end positions, in a first one of which said valve closes off the warm air intake duct while opening the cold air intake duct, and in the second one of which said valve closes off the cold air intake duct while opening the warm air intake duct, the valve being movable to intermediate positions in which both intake ducts are partially open for the admission to the raw air mixing duct of both cold raw air and preheated raw air, in proportions determined by the valve position;

a thermostat chamber defined by chamber walls which are solidary with the raw air duct, the thermostat chamber having a calibrated warm air branch inlet for the supply of a branch flow of preheated raw air from the warm air intake duct to the thermostat chamber, a calibrated cold air branch inlet for the supply of a branch flow of ambient raw air from the outside to the thermostat chamber, and an outlet through which said branch flows rejoin the flow of combustion air which is supplied to the internal combustion engine by the air intake system;

a wax thermostat arranged in the thermostat chamber downstream of the calibrated branch inlets for preheated raw air and ambient raw air and upstream of said outlet, the thermostat and the walls of the thermostat chamber forming a flow gap for the passage of said branch flows, the cross section of said flow gap being a fraction of the smallest flow cross section of the raw air mixing duct; and drive means for connecting the wax thermostat to the flow proportioning valve in such a way that an expansion of the wax thermostat in response to an increase in its temperature produces a displacement of the flow proportioning valve in the direction of said first valve end position and a contraction of the wax thermostat in response to a decrease in its temperature produces a displacement of the flow proportioning valve in the direction of said second valve end position.

2. An intake air temperature control device as defined in claim 1, wherein
the flow gap between the wax thermostat and the walls of the thermostat chamber is an annular flow gap; and
the cross section of said flow gap is no greater than twenty percent of the smallest flow cross section of the raw air mixing duct.

3. An intake air temperature control device as defined in claim 2, wherein
the wall of the thermostat chamber and the wax thermostat have concentric circular outlines, where they form said annular flow gap; and
the cross section of said flow gap is equal to approximately two percent of the smallest flow cross section of the raw air mixing duct.

4. An intake air temperature control device as defined in claim 1, wherein
at least one of the two calibrated branch inlets of the thermostat chamber has valve means associated therewith, the valve means being operable to adjust the opening of the calibrated branch inlet in the same sense in which the drive means connected to the wax thermostat moves the flow proportioning valve to adjust the flow of the same kind of raw air into the raw air mixing duct.

5. An intake air temperature control device as defined in claim 1, wherein
both calibrated branch inlets of the thermostat chamber have valve means associated therewith;
the valve means associated with the calibrated cold air branch inlet is operable to adjust the opening of the calibrated cold air branch inlet in the same sense in which the drive means connected to the wax thermostat moves the flow proportioning valve to adjust the flow of cold raw air into the raw air mixing duct; and
the valve means associated with the calibrated warm air branch inlet is operable to adjust the opening of the calibrated warm air branch inlet in the same sense in which the drive means connected to the wax thermostat moves the flow proportioning valve to adjust the flow of preheated raw air into the raw air mixing duct.

6. An intake air temperature control device as defined in claim 1, wherein
the calibrated cold air branch inlet for the admission of a branch flow of ambient raw air to the thermostat chamber is the downstream end of a branch channel which has its upstream inlet located in the immediate vicinity of the cold air inlet of the cold air intake duct.

7. An intake air temperature control device as defined in claim 1, wherein
the drive means connecting the wax thermostat to the flow proportioning valve includes a lost-motion drive connection and means for biasing the flow proportioning valve within the lost-motion drive connection towards the second end position of the flow proportioning valve.

8. An intake air temperature control device as defined in claim 7, wherein
the valve biasing means is a spring means.

9. An intake air temperature control device as defined in claim 7, wherein
the valve biasing means is a weight means.

10. An intake air temperature control device as defined in claim 7, wherein
the internal combustion engine is a carburetor-type internal combustion engine;
the valve biasing means is a pneumatic actuator using the negative pressure created by the engine downstream of the carburetor throttle to create a valve biasing force, in opposition to an actuator return spring, the negative pressure decreasing with increasing operating load of the engine.

11. An intake air temperature control device as defined in claim 7, wherein
the duct junction is formed by the warm air intake duct opening into the cold air intake duct in a substantially perpendicular orientation thereto, the opening of the warm air intake duct defining a plane which is substantially parallel to the orientation of the cold air intake duct, and the raw air mixing duct extending substantially in alignment with the cold air intake duct;
the flow proportioning valve includes a substantially flat inlet flapper supported on a pivot shaft which extends substantially perpendicularly to the orientation of the cold air intake duct and parallel to said opening plane of the warm air intake duct, on the upstream side of the duct junction, as seen in the direction in which cold raw air flows through the cold air intake duct, the pivot shaft thereby positioning the inlet flapper in such a way that it abuts against the opening of the warm air intake duct in the first end position of the valve and extends transversely across the cold air intake duct in the second end position of the valve;
the thermostat chamber is a generally tubular chamber extending parallel to and laterally adjoining the raw air mixing duct, the thermostat chamber including a guide bore which opens into the warm air intake duct, just upstream of its opening in the duct junction, as seen in the direction in which preheated raw air flows through the warm air intake duct, the calibrated warm air branch inlet being located in the area of said guide bore, and the outlet of the thermostat chamber being located at the opposite extremity of the thermostat chamber, opening into the raw air mixing duct;
the thermostat is located near the downstream extremity of the thermostat chamber, having a generally rotational outline and forming an annular flow gap with the wall of the thermostat chamber;
the drive means connecting the wax thermostat to the flow proportioning valve includes a drive pin extending axially upstream from the wax thermostat, a flapper drive rod extending through the guide bore on the upstream extremity of the thermostat chamber and into operative engagement with a drive arm which is connected to the inlet flapper in such a way that the latter is pivoted toward the first valve end position, when the wax thermostat expands in response to a higher temperature in the thermostat chamber; and
said drive means further includes spring means for returning the flapper drive rod and the connected inlet flapper toward the second valve end position, when the wax thermostat contracts in response to a lower temperature in the thermostat chamber, and means for yieldingly connecting the thermostat drive pin to the downstream axial extremity of the flapper drive rod.

12. An intake air temperature control device as defined in claim 11, wherein the means for yieldingly connecting the thermostat drive pin to the flapper drive rod includes a drive sleeve which has a downstream axial extremity connected to the upstream axial extremity of the drive pin and an upstream axial extremity connected to the downstream axial extremity of the flapper drive rod in such a way that the connection is capable of yielding compressively, in opposition to an overload relief spring which is compressed between the drive sleeve and the flapper drive rod, under an elevated pushing force on the drive pin.

13. An intake air temperature control device as defined in claim 11, wherein the calibrated cold air branch inlet is in the form of a radial opening in the wall of the thermostat chamber which is located downstream of the downstream axial extremity of the drive sleeve;

the downstream axial extremity of the drive sleeve defines a valve edge at its outer periphery; and the inlet opening is located at such a distance from the valve edge of the drive sleeve that its cooperates with the latter to open and close the calibrated cold air branch inlet, as the drive sleeve executes axial movements in the upstream and downstream directions, respectively.

14. An intake air temperature control device as defined in claim 11, wherein the flapper drive rod extends through the guide bore on the upstream extremity of the thermostat chamber with a radial recess in its cross-sectional profile which defines an axial channel within the guide bore, said axial channel serving as the calibrated warm air branch inlet.

15. An intake air temperature control device as defined in claim 14, wherein the flapper drive rod defines a valve edge at the transition from said radial recess to a circular cross-sectional profile at the downstream axial end of said recess; and the valve edge is located at such a distance form the downstream axial extremity of the guide bore that it cooperates with the guide bore to open and close the calibrated warm air branch inlet, as the flapper drive rod executes axial movements in the downstream and upstream directions, respectively.

16. An intake air temperature control device as defined in claim 11, wherein the flapper drive rod, which extends into operative engagement with a drive arm connected to the inlet flapper, defines with said drive arm a lost-motion drive connection which includes a recess near the upstream axial extremity of the flapper drive rod which is engaged by an extremity of said drive arm, the recess being delimited by a driving face on the downstream axial end of the recess and a counter face on the upstream axial end of the recess, the axial distance between said faces being such that the engaged drive arm can execute a lost motion between them; and the drive means further includes, in association with said lost-motion drive connection, means for biasing the drive arm of the inlet flapper against the driving face of the recess, so that the inlet flapper is biased towards the second valve end position.

17. An intake air temperature control device as defined in claim 16, wherein the drive arm biasing means includes a tension spring which has one extremity attached to the drive arm and the other extremity attached to the flapper drive rod, at a downstream axial distance from the driving face.

18. An intake air temperature control device as defined in claim 16, wherein the drive arm biasing means includes an arm which is connected to the inlet flapper so as to reach into the cold air intake duct and a tension spring which has one extremity attached to said arm and the other extremity attached to a wall of the cold air intake duct on the side of the duct junction.

19. An intake air temperature control device as defined in claim 16, wherein the drive arm biasing means includes a weight arm connected to the inlet flapper and a biasing weight attached to the weight arm, the weight arm being so oriented in relation to the angular movement range of the inlet flapper that the biasing weight tends to move the inlet flapper in the direction of the second valve end position.

20. An intake air temperature control device as defined in claim 16, wherein the control device is designed for use in an air intake system for an internal combustion engine with a carburetor, the engine having an engine intake duct downstream of the carburetor throttle, where the throttle action creates negative air pressure in reverse proportion to the load which is applied to the internal combustion engine;

the drive arm biasing means includes a pneumatic actuator with a push-pull drive linkage which has one extremity connected to the inlet flapper at a leverage arm in relation to its pivot shaft, the pneumatic actuator further including a housing and a diaphragm inside said housing defining a pressure space, a pressure line linking the pressure space to the engine intake duct, and a return spring opposing diaphragm movements under increasing negative pressure in the pressure space, said negative pressure providing a variable drive arm bias which decreases as the engine load increases.

* * * * *